United States Patent [19]

Wolf

[11] Patent Number: 4,903,467
[45] Date of Patent: Feb. 27, 1990

[54] SELF-PROPELLED LAWNMOWER

[75] Inventor: Pierre Wolf, Wissembourg, France

[73] Assignee: Etesia, Wissembourg, France

[21] Appl. No.: 78,160

[22] Filed: Jul. 27, 1987

[30] Foreign Application Priority Data

Jul. 25, 1986 [FR] France .................. 86 11158
Jun. 26, 1987 [FR] France .................. 87 09186

[51] Int. Cl.$^4$ .......................... A01D 34/70
[52] U.S. Cl. ...................... 56/16.6; 56/202; 56/DIG. 22
[58] Field of Search ............ 56/14.7, 16.6, 202, 56/DIG. 22, 6, 7; 180/900

[56] References Cited

U.S. PATENT DOCUMENTS

| 3,065,588 | 11/1962 | Shaw | 56/16.6 |
| 3,837,157 | 9/1974 | Van Der Lely | 56/202 |
| 3,969,876 | 7/1976 | Turos | 56/202 |
| 4,263,977 | 4/1981 | Willett | 56/DIG. 22 |
| 4,430,849 | 2/1984 | Wilson et al. | 56/16.6 |

FOREIGN PATENT DOCUMENTS

| 0155437 | 9/1985 | European Pat. Off. . |
| 88279 | 9/1983 | Fed. Rep. of Germany | 56/202 |
| 172160 | 2/1986 | Fed. Rep. of Germany | 56/14.7 |

Primary Examiner—John Weiss
Attorney, Agent, or Firm—Young & Thompson

[57] ABSTRACT

Lawn mower characterized in that the rear drive wheels (4) are mounted on a rear interconnecting member (6) in the form of a portico permitting mounting of a receptacle (7) for receiving cut grass directly on the outlet opening of the ejection channel of the cutter housing (5) between the rear wheels (4).

4 Claims, 3 Drawing Sheets

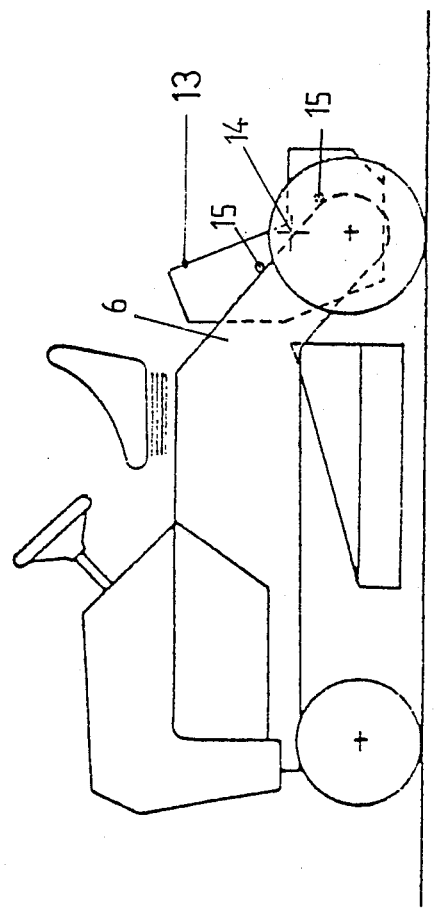

SELF-PROPELLED LAWNMOWER

The present invention concerns the field of lawn mowers, especially self-propelled lawn mowers, and has for an object such a lawn mower.

Generally, lawn mowers of this type have a wide cutting swath, and consequently are either equipped with several identical cutting blades turning in the same direction, or are equipped with counter-rotating blades, or with a single cutting blade or a principal cutting blade cooperating with secondary blades.

Lawn mowers with cutting blades turning in the same direction generally have a lateral ejection device to which the cut grass is conducted by transfer from one blade to the adjacent blade. These lawn mowers are nevertheless unsuited for direct gathering of the grass and permit only mediocre cutting quality of medium-height and tall grass.

Lawn mowers with counter-rotating blades most frequently have a central rear ejection and are unsuited to receive a device for direct gathering because their ejection channel, resulting from the construction of the lawn mower, is too low, and the necessary place for direct fixation of a receptacle for receiving cut grass does not exist.

Finally, lawn mowers of the type having a single cutting blade or a principal cutting blade cooperative with secondary blades are generally equipped with a tube or a channel for transfer of the cut grass toward a rearwardly mounted gathering receptacle. This embodiment requires above all a significant blowing action for transporting the cut grass, which results in an elevated noise level. Moreover, these known lawn mowers permit a correct cutting only of short and dry grass, and rapidly become clogged in the case of a large volume of grass.

Furthermore, all of the known self-propelled lawn mowers generally have a rigid rear axle disposed in the axis of the wheels, which prevents any provision of a channel for transfer of the cut grass.

The present invention has for an object to overcome these disadvantages.

Specifically, it has as an object a self-propelled lawn mower, essentially constituted by a carrier chassis provided with a drive motor at the front, front directional wheels, rear drive wheels, and a ventral cutter housing with two synchronized counter-rotating blades instead of a conventional practically flat cutting head, characterized in that the rear drive wheels are mounted on a rear interconnecting member in the form of a portico permitting the mounting of a receptacle for receiving the cut grass, directly on the outlet opening of the ejection channel of the cutting head between the rear wheels.

Moreover, it is possible to increase the applications of the self-propelled lawn mower, by providing in the space comprised between the rear wheels, instead of a receptacle for receiving grass, accessory tools such as, for example, a grass deflector, a transport bin, a fertilizer distributor, a plow, etc.

The mounting of these accessories is effected such that the center of gravity of the transported load acts directly on the drive wheels. The traction or the motility of the wheels is thus increased with the increase of the load, contrary to the known devices.

The invention will be best understood thanks to the following description, which relates to a preferred embodiment given by way of non-limiting example and explained with reference to the accompanying schematic drawings, in which:

FIG. 4 is a view like that of FIG. 1 showing a transport bin in place of the collecting receptacle.

Figure 1:
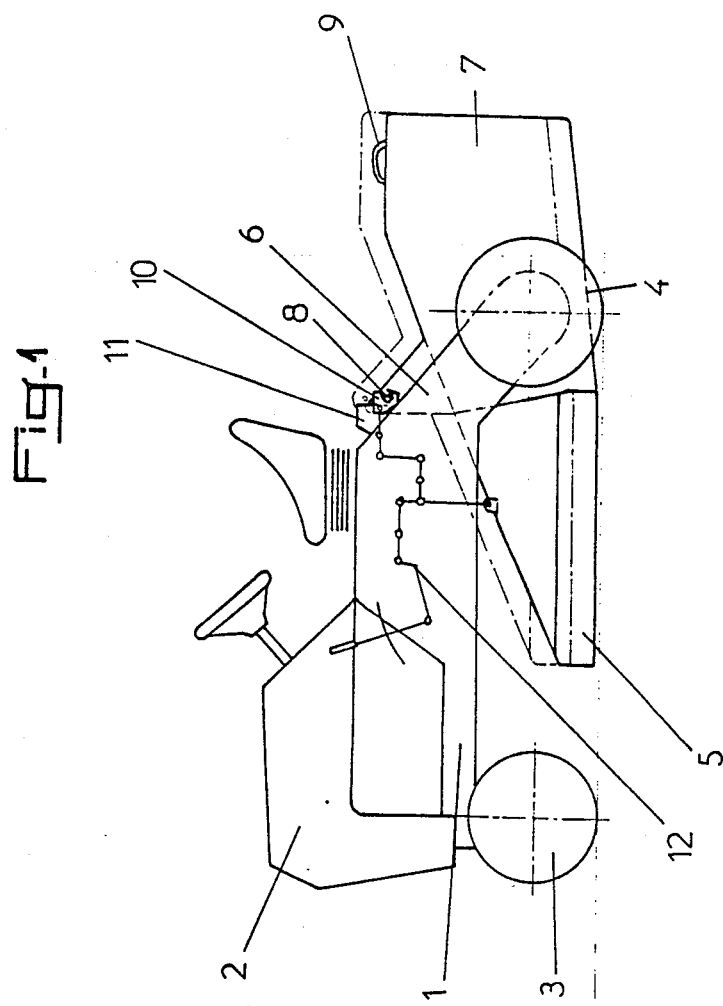
FIG. 1 is a view in side elevation of a lawn mower according to the invention.
Figure 2:
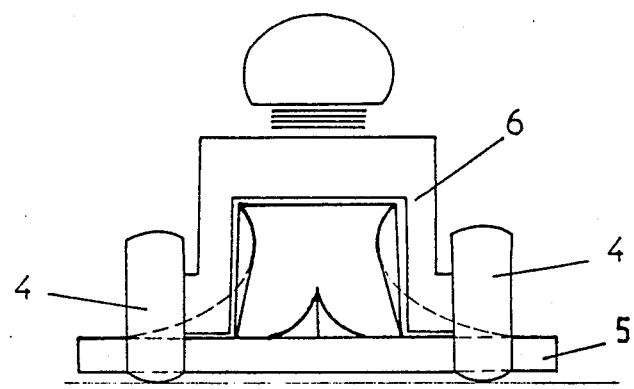
FIG. 2 is a view in rear elevation of the rear interconnecting member.

According to the invention, and as is shown more particularly by way of example in FIG. 1 of the accompanying drawings, the self-propelled lawn mower, essentially constituted by a carrier chassis 1 which is provided forwardly with a drive motor 2, directional front wheels 3, rear drive wheels 4, and a cutter housing 5 with two synchronized counter-rotating blades, is characterized in that the rear drive wheels are mounted on a rear interconnecting member 6 in the form of a portico, that permits mounting a receptacle 7 for receiving cut grass, directly on the outlet opening of the ejection channel of the cutter housing 5 between the rear wheels 4.

According to another characteristic of the invention, instead of the collecting receptacle 7, there may be mounted accessory tools such as, for example, a grass deflector, a transport bin 13, a fertilizer distributor, a plow, etc., by means of bearings 14, such that the center of gravity of the transported load acts directly on the rear wheels or drive wheels 4.

The rear wheels 4 are each individually independently driven, in a known manner, through the intermediary of a differential housed in the upper cross piece of the interconnecting member and the output shafts of which control the hubs of the wheels 4 each through the intermediary of a rack and pinion assembly housed in the arms of the portico. Such a transmission means is known in itself, and is not shown in detail in the accompanying drawings.

The construction of the interconnecting member 6 permits freeing a significant space at the level of the axis of the wheels 4.

The cutter housing 5 is mounted beneath the chassis 1 near the rear wheels 4, such that the outlet opening of its ejection channel extends entirely into the space freed by the rear interconnecting member 6 determined by the spacing of the arms for mounting the wheels 4.

The receptacle 7 for collecting the cut grass is removable, and is tiltably mounted on the upper portion of the rear interconnecting member 6, by means of pivots 8, and has an open front portion the section of which corresponds to the section for passage between the arms of the interconnecting member 6 in the form of a portico, and which is applied on the outlet opening of the ejection channel of the cutter housing 5, in the immediate proximity of the trajectory of the cutting blades. In a known manner, the receptacle 7 is moreover provided with a manipulating handle 9 permitting its tilting, in order to empty it, directly from the driver's seat.

Figure 3:
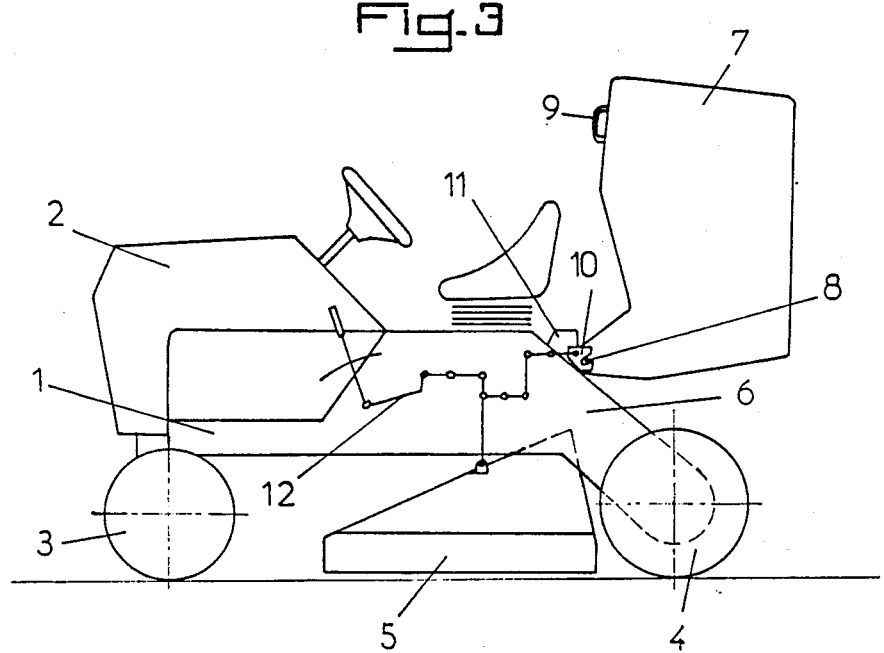
FIG. 3 is a view like that of FIG. 1 showing the receptacle for receiving cut grass in emptying position.

According to another characteristic of the invention, the pivots 8 for the receptacle 7 for receiving cut grass are removably mounted in open bearings 10, vertically displaceably guided on vertical flanges 11 fixed to the upper portion of the interconnecting member 6, and actuated in vertical translation simultaneously with the cutter housing 5 through the intermediary of a connecting linkage 12 (FIGS. 1 and 3). Thus, at the time of adjusting the cutting height, the bearings 10 are simultaneously displaced in the same direction as the cutter housing 5, such that the receptacle 7 is always perfectly aligned with the said housing 5. By way of example, the high position of the head 5 and of the receptacle 7 is shown in phantom line in FIG. 1.

According to another characteristic of the invention, not shown in the accompanying drawings, the pivots 8 of the receptacle 7 for receiving cut grass are removably mounted in open bearings 10, fixed to the cutting head 5.

According to another characteristic of the invention, shown in FIG. 4, the self-propelled lawn mower may be provided, among others, with a transport bin 13 when it is not provided with a collecting receptacle 7. A preferred embodiment of this transport bin 13 is characterized in that:

- the mounting of the transport bin by means of bearings 14 is effected such that the center of gravity of the transported load acts directly on the drive wheels. The contact with the ground or the motility of the wheels is thus increased with the increase of the load, contrary to the known devices
- by simple pivoting of the device, the transport bin may serve as a deflector for the cut grass
- the transport bin is rotatably mounted such that the transported load may be emptied by tilting with minimal physical effort by the user.

Moreover, the transport bin 13 is advantageously provided, on at least one side surface, with locking means 15 in the form of abutments cooperating with a correspondingly shaped movable element provided on the corresponding upright of the portico forming the rear interconnecting member 6 of the lawn mower, the said locking means 15 being advantageously in the form of simple holes provided on the surface of the bin 13, and the movable element being in the form of a bolt or the like.

Thanks to the invention, it is possible to realize a self-propelled lawn mower assuring direct gathering of the cut grass with great efficiency. This latter is obtained, in particular, thanks to the provision of a rear interconnecting member 6 in the shape of a portico freeing a significant space which can be used to advantage to assure passage of the forward part of the receptacle 7 and its direct connection on the outlet opening of the ejection channel of the cutting housing 5.

It will be understood that the invention is not limited to the embodiment described and shown in the accompanying drawings. Modifications remain possible, particularly from the point of view of the constitution of the various elements, or by substitution of equivalent techniques, without departing whatsoever from the scope of protection of the invention.

The embodiments of the invention, for the subject of which an exclusive proprietary right or privilege is claimed as defined as follows:

1. Self-propelled lawn mower, essentially constituted by a carrier chassis (1) provided with a forwardly mounted drive motor (2), directional front wheels (3), rear drive wheels (4), and a ventral cutter housing (5) having an ejection channel having an outlet opening, the cutter housing (5) being supported by the chassis (1) and having two synchronized counter-rotating blades, characterized in that the rear drive wheels (4) are mounted on a rear interconnecting member (6) in the form of a portico on which is supported a receptacle (7) for receiving cut grass, directly on the outlet opening of the ejection channel of the cutter housing (5) between the rear wheels (4).

2. Lawn mower according to claim 1, characterized in that the cutter housing (5) is mounted beneath the chassis (1) near the rear wheels (4), such that the outlet opening of its ejection channel extends entirely into the space defined by the rear interconnecting member (6) determined by the spacing of mounting arms for the wheels (4).

3. Lawn mower according to claim 1, characterized in that the receptacle (7) for receiving cut grass is tiltably and removably mounted on the upper portion of the rear interconnecting member (6), by means of pivots (8), and has an open front portion of a size which corresponds to the space available for passage between arms of the interconnecting member (6) in the form of a portico, and which is applied on the outlet opening of the ejection channel of the cutter housing (5), in immediately proximity of the trajectory of the rotating blades.

4. Lawn mower according to claim 3, characterized in that the pivots (8) of the receptacle (7) for receiving cut grass are removably mounted in open bearings (10) carried by the mower.

* * * * *